United States Patent [19]

Nakamura

[11] Patent Number: 4,958,791
[45] Date of Patent: Sep. 25, 1990

[54] TYING MEANS
[75] Inventor: Toshinobu Nakamura, Tokyo, Japan
[73] Assignee: Shinagawa Shoko Co., Ltd., Tokyo, Japan
[21] Appl. No.: 333,247
[22] Filed: Apr. 5, 1989
[51] Int. Cl.⁵ .................................................. F16L 3/08
[52] U.S. Cl. ................................ 248/74.1; 24/16 PB; 248/68.1
[58] Field of Search ............... 248/74.1, 74.3, 74.4, 248/73, 71, 68.1; 24/546, 466, 571, 16 PB, 17 AP, 555

[56] References Cited

U.S. PATENT DOCUMENTS

| 3,088,702 | 5/1963 | Orenick et al. | 248/71 |
| 3,163,712 | 12/1964 | Cochran | 248/74.3 X |
| 3,515,363 | 6/1970 | Fisher | 248/74.3 X |
| 3,516,631 | 6/1970 | Santucci | 248/71 |
| 4,061,299 | 12/1977 | Kurosaki | 248/74.3 X |
| 4,371,137 | 2/1983 | Anscher | 248/73 |
| 4,564,163 | 1/1986 | Barnett | 248/74.3 X |
| 4,637,097 | 1/1987 | Secord | 248/73 X |
| 4,669,688 | 6/1987 | Itoh et al. | 248/74.3 X |

FOREIGN PATENT DOCUMENTS

| 1000677 | 11/1976 | Canada | 248/74.1 |
| 56-4614 | 1/1981 | Japan . | |
| 60-23611 | 2/1985 | Japan . | |
| 2092216 | 8/1982 | United Kingdom | 248/74.2 |

Primary Examiner—Karen J. Chotkowski
Attorney, Agent, or Firm—Fidelman & Wolffe

[57] ABSTRACT

A tying device includes a belt-like annular member which is diametrically deformable due to its resiliency and a parallel arrangement of receiving and engaging hooks provided on each of both divided ends of the annular member. The receiving hook includes a lower member and an upper member bifurcated therefrom and having a knob, and the engaging hook provided on one end serves as a member to prevent transverse slipping of the engaging hook provided at the opposite end, which is located in between the lower and upper members of the receiving hook adjacent thereto.

9 Claims, 7 Drawing Sheets

TYING MEANS

BACKGROUND OF THE INVENTION

1. Field of the Invention

The present invention relates to a tying means especially designed to tie up electronic parts such as capacitors in electrical equipment and electrical wires in wiring systems. The tying means according to the present invention may also be applied not only to tie canes, stalks or bines against props in agricultural and horticultural fields but also to seal up bags formed of paper, cloth, synthetic resin and other like material.

2. Statement of the Prior Art

Conventional means used to tie up relatively small electronic parts such as capacitors and wires in electrical equipment is referred to as the tying band. This tying band includes a flexible plastic narrow band and a locking means provided at its one end. After wires are tied up by the narrow band, the narrow band is inserted and locked at its other end through said locking means and its excessive portion is cut off.

Conventional means used in agricultural and horticultural fields are normally called the vinyl tie. This comprises a synthetic resin band of a narrow width and several fine metal wires embedded therethrough. For use, it is first cut to the required length, and is then wound around a prop with canes, stalks or bines and twisted up at both its ends. An excessive portion, if any, is cut off.

Of the aforesaid tying means, the former is designed such that after tying up parts as mentioned above, its excessive portion is cut off. In this case, the resulting cuttings should be collected. However, such cuttings may possibly be left in equipment or parts after assembling. Not only is the removal of the cuttings troublesome and timeconsuming but also they may result in the malfunction of equipment, if not removed. Moreover, once the tying band is used for tying-up, it cannot substantially be re-used, partly because its excessive portion has been cut off and partly because its removal is not easy after tying-up.

The same is also said of the second tying means called the vinyl tie used in agricultural and horticultural fields.

Proposed for electrical equipment of a relatively large size is a re-usable type of tying means which comprises a set of an engaging member and an associated member. A problem with this arrangement is that the set of engaging and associated members may be out of place upon receiving an accidental impact or vibration. Another problem is that means for preventing transverse slipping of the engaging member has to be separately provided. However, serious difficulty is encountered in the provision of such slip-preventing means to tying means used with relatively small parts such as electronic parts.

SUMMARY OF THE INVENTION

The present invention has been accomplished for the purpose of solving such problems as mentioned.

Therefore, a primary object of the present invention is to provide a tying means which is of a simple structure and gives firm engagement with no fear of disengagement upon receiving impacts, etc.

Another object of the present invention is to provide a simple and cheap tying means which is applicable not only to electrical equipment and agricultural/horticultural tools of relatively large sizes but also to those of relatively small sizes.

A further object of the present invention is to provide a tying means which can be handled simply and rapidly with no fear of wasting material and with no need of any excessive work.

A still further object of the present invention is to provide a tying means which can be re-used.

A still further object of the present invention is to provide a tying means which can surely and closely tie up materials to be tied up, even when their diameter is smaller than that defined by said tying means.

According to the present invention, the above objects are achieved by the provision of a tying means including a belt-like annular member which is diametrically deformable due to its resiliency and a parallel arrangement of receiving and engaging hooks provided on each of both divided ends of said annular member, said receiving hook including a lower member and an upper member bifurcated therefrom and having a knob, and said engaging hook provided on one end serving as a member to prevent transverse slipping of said engaging hook provided at the opposite end, which is located in between the lower and upper members of said receiving hook adjacent thereto.

BRIEF DESCRIPTION OF THE DRAWINGS

The present invention will now be explained in more detail with reference to the preferred embodiments illustrated in the accompanying drawing, which are given for the purpose of illustration alone and in which.

DETAILED DESCRIPTION OF THE INVENTION

Figure 1:
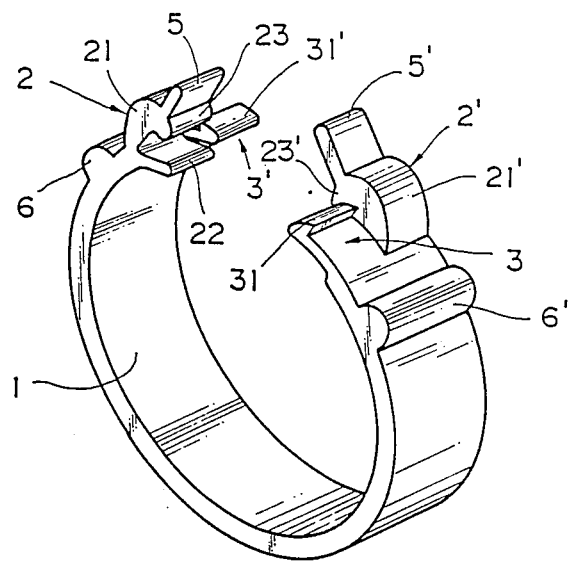
FIG. 1 is a perspective view of one embodiment of the tying means according to the present invention.
Figure 2:
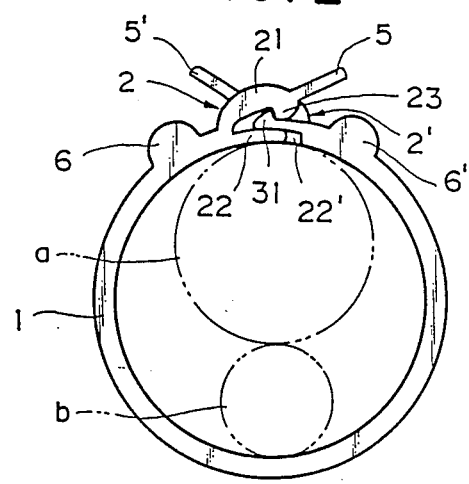
FIG. 2 is a side view of that embodiment.

Referring now to FIGS. 1 and 2, there is shown a tying means generally shown at 1, which comprises a belt-like annular member formed of a synthetic resin such as nylon in such a manner that it is diametrically deformable due to its resiliency.

Said annular member 1 has a given width and is transversely divided, as shown. One divided end is transversely provided with a parallel arrangement of a receiving hook 2 and an engaging hook 3', and the other end with a parallel arrangement of an engaging hook 3 and a receiving hook 2'. The engaging hook 3 engages the opposite receiving hook 2, while the engaging hook 3' engages the opposite receiving hook 2'.

The receiving hooks 2 and 2' are of the same structure, and include lower members 22 and 22' and upper members 21 and 21' bifurcated therefrom and having engaging projections 23 and 23' and knobs 5 and 5'. The engaging hooks 3 and 3' are of the same structure, and include engaging projections 31 and 31'. The engaging hook 3 or 3' is then located in between the bifurcated lower and upper members 22 and 21 or the bifuracted lower and upper members 22 and 21' forming the receiving hook 2 or 2'. The annular member 1 is provided with pushing ribs 6 and 6' in the vicinity of the parallel arrangements of the receiving and engaging hooks.

In order to tie up materials to be tied up with the use of the tying means of the above structure, the annular member 1 is first kept open, as shown in FIG. 1. Then, materials a and b to be tied up such as props and canes are inserted through the annular member 1, as shown in FIG. 2, and the ribs 6 and 6' are pushed in the direction of closing up the annular member 1. In this operation, the annular member 1 deforms resiliently to decrease its diameter, so that the engaging hooks 3 and 3' are simultaneously introduced onto the receiving hooks 2 and 2', whereby the annular member 1 is kept closed up by two sets of hook mechanisms.

Thus, the projection 31 of the engaging hook 3 located in between the lower and upper members 22 and 23, forming the receiving hook 2, abuts on its side against the side of the projection 31' of the engaging hook 3' positioned in parallel thereto, and the projection 31' of the engaging hook 3' located in between the lower and upper members 22' and 21', forming the receiving hook 2', abuts on its side against the side of the projection 31 of the engaging hook 3 positioned in parallel thereto, thereby preventing any disengagement of the receiving and engaging hooks due to transverse slipping.

For the purpose of untying, the knobs 5 and 5' are pushed toward each other. Thus, the upper members 21 and 21' of the receiving hooks 2 and 2' are lifted up so that the engaging hooks 3 and 3' are disengaged from the receiving hooks 2 and 2' due to the resilient force of the annular member 1.

Figure 3:
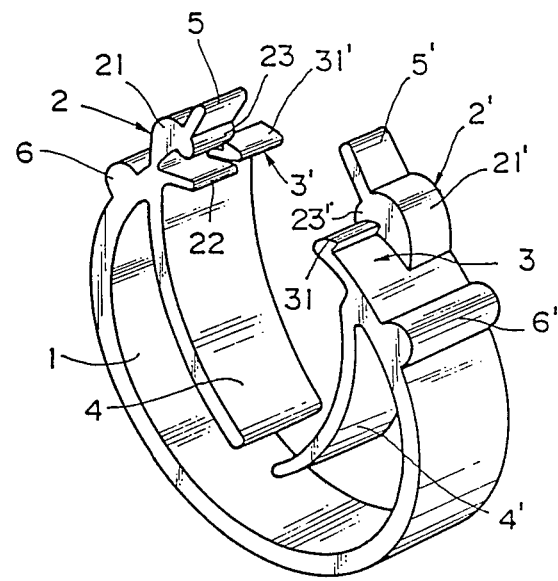
FIG. 3 is a perspective view of another embodiment of the tying means according to the present invention.
Figure 4:
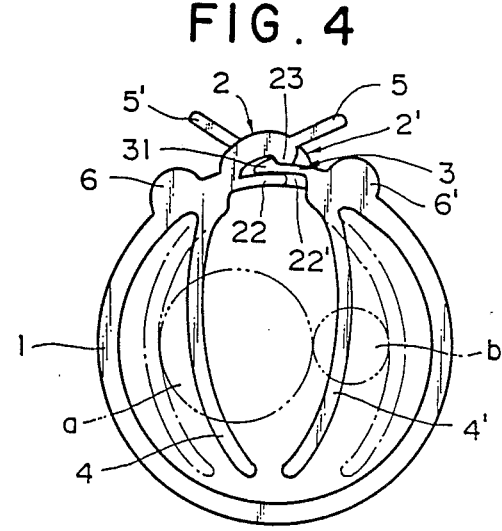
FIG. 4 is a side view of that embodiment.

In the second embodiment illustrated in FIGS. 3 and 4, two belt-like arms 4 and 4' are provided on the required regions of the inner face of an annular member 1. When materials a and b to be tied up have a diameter smaller than the diameter of the closed-up annular member, the materials are resiliently embraced and held by said beltlike arms 4 and 4'.

Figure 5:
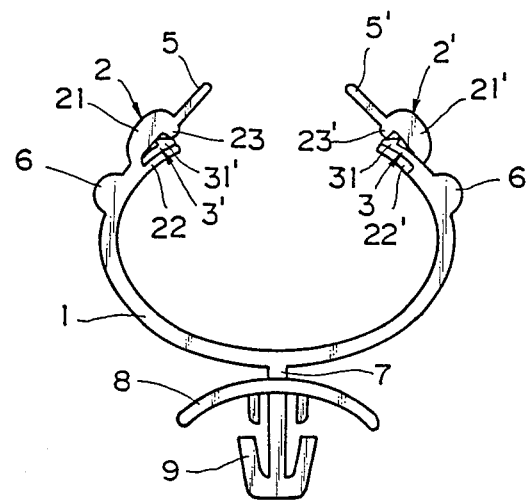
FIG. 5 is a perspective view of a further embodiment of the tying means according to the present invention.
Figure 6:
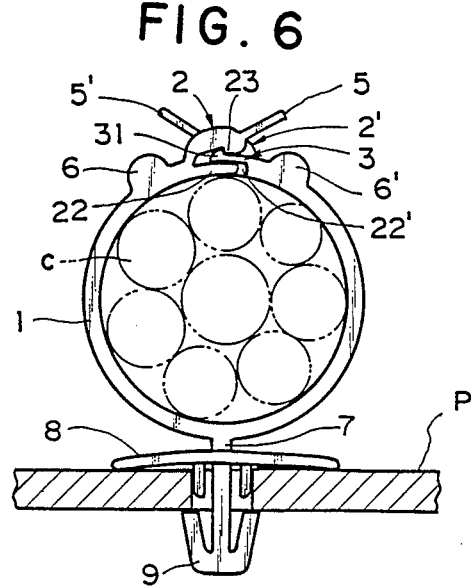
FIG. 6 is a side of the embodiment of FIG. 5 attached to a printed board.

In the third embodiment illustrated in FIGS. 5 and 6, an annular member 1 is provided on its central portion with a leg member 7 and keep members 8 and 9 in an integral manner so as to mount it on a printed board. Materials to be tied up, shown at c, are a bundle of electrical wires.

Figure 7:
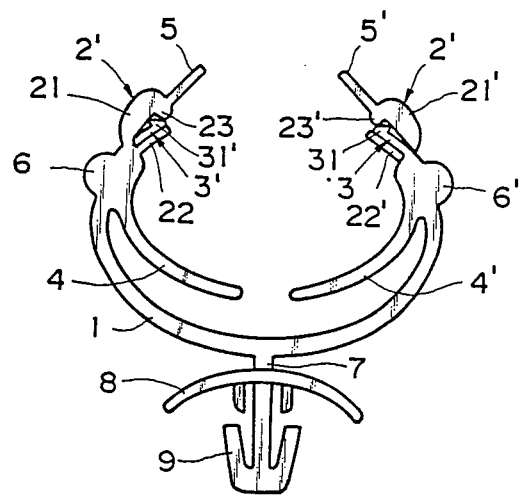
FIG. 7 is a perspective view of a still further embodiment of the tying means according to the present invention.
Figure 8:
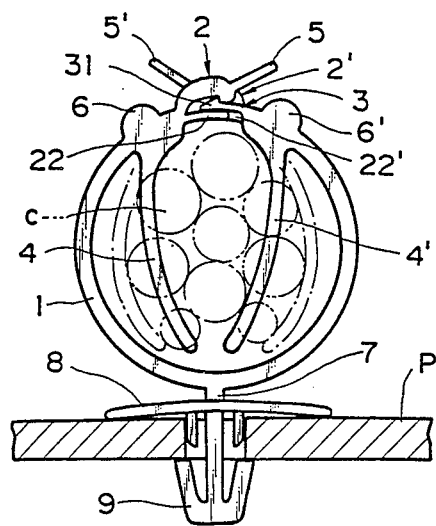
FIG. 8 is a side view of the embodiment of FIG. 7 attached to a printed board.

In the fourth embodiment illustrated in FIGS. 7 and 8, the annular member 1 of FIGS. 5 and 6 is provided with belt-like arms 4 and 4' for materials to be tied up.

Figure 9:
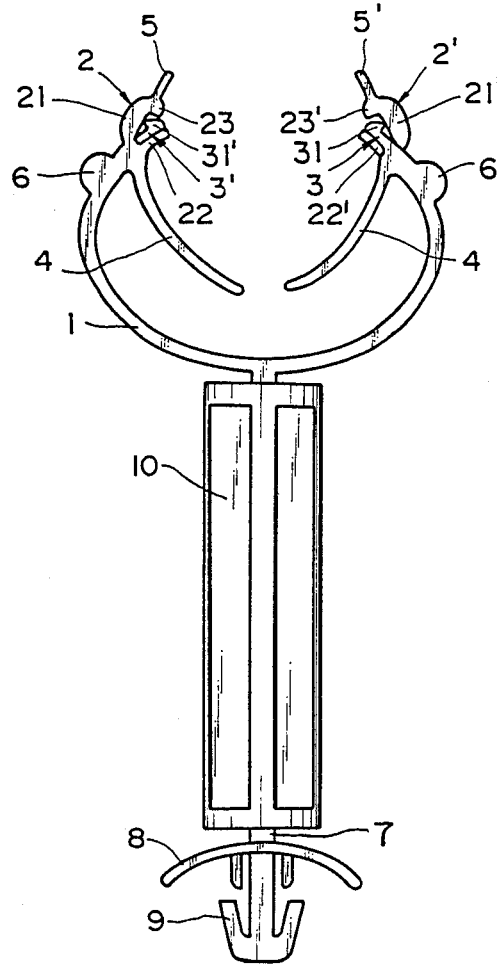
FIG. 9 is a perspective view of a still further embodiment of the tying means according to the present invention.
Figure 10:
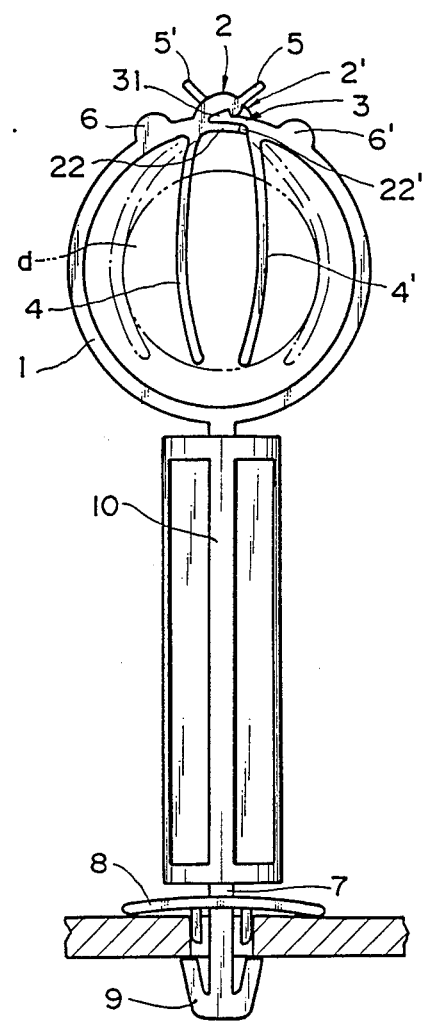
FIG. 10 is a side view of the embodiment of FIG. 9 attached to a printed board.

In the fifth embodiment illustrated in FIGS. 9 and 10, the annular member 1 of FIGS. 5 and 6 is provided with a spacer member 10, a leg member 7 and keep members 8 and 9 in an integral manner. A material to be tied up, shown at d, is a capacitor.

Figure 11:
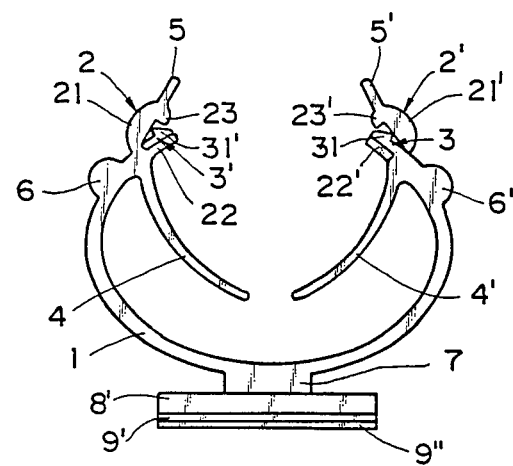
FIG. 11 is a perspective view of a still further embodiment of the tying means according to the present invention.
Figure 12:
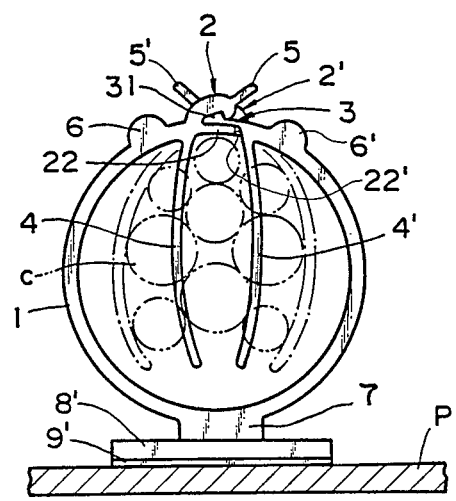
FIG. 12 is a side view of the embodiment of FIG. 10 attached to a printed board.

In the sixth embodiment illustrated in FIGS. 11 and 12, a plate 8' is provided to a leg member 7, and provision is further made of an adhesive layer 9' and a releasing layer 9'' for a printed board P.

Figure 13:
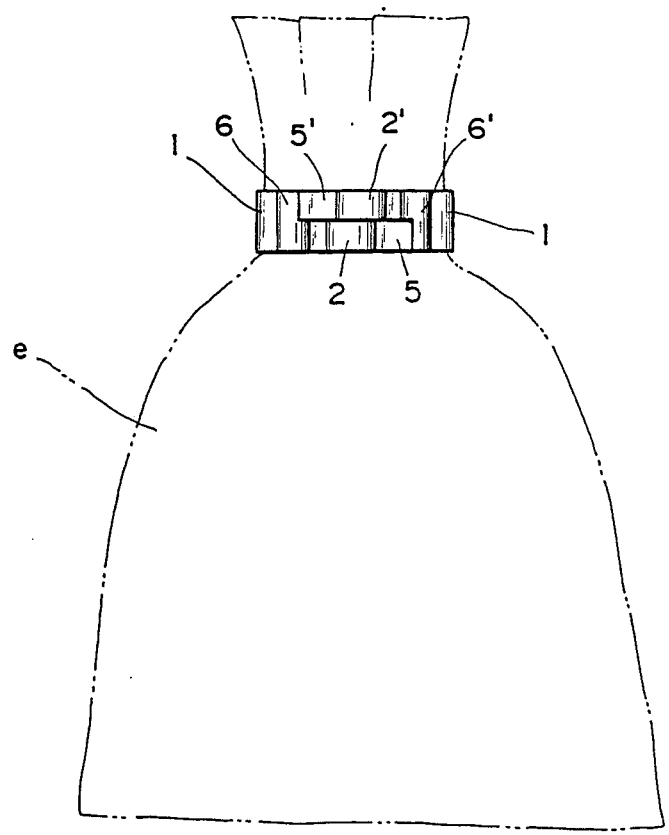
FIG. 13 is a plan view of the present tying means used to seal up a bag.

FIG. 13 shows a bag formed of paper, cloth, synthetic resin or like other material, the opening of which is sealed up by the tying means of the present invention.

According to the present invention as detailed above, the parallel arrangements of receiving and engaging hooks are provided on both divided ends of an annular member to prevent disengagement of the hooks due to transverse slipping.

It is understood that the above described embodiments are simply illustrative of the application of principles of the invention and many other modifications may be made without departing from the spirit and scope of the invention.

The embodiments of the invention in which an exclusive property or privilege is claimed are defined as follows:

1. A belt-like clamping device comprising a belt-like annular member having a first and second proximal end, each proximal end having an outward-facing engaging hook and an inward-facing receiving hook laterally juxtaposed to a respective outward facing engaging hook, said inward-facing receiving hooks comprising raised upper members, so that when the first proximal end is brought into engagement with the second proximal end:
    the outward-facing engaging hook of the first proximal end engages the inward-facing receiving hook of the second proximal end and
    the outward-facing engaging hook of the second proximal end engages the inward-facing receiving hook of the first proximal end and
    said raised upper members of said inward-facing receiving hooks being laterally juxtaposed to prevent lateral movement of the first and second proximal ends when said ends are engaged.

2. A belt-like clamping device as claimed in claim 1, wherein said inward-facing receiving hooks on said first and second proximal ends each have a knob attached thereto for actuating the receiving hooks with a finger so that the belt-like clamping device may be opened.

3. A belt-like clamping device as claimed in claim 1, having two pushing ribs located on an outer side of the belt-like annular member substantially near the proximal end for gripping the belt-like clamping device so that the first proximal end may be brought into engagement with the second proximal end.

4. A belt-like clamping device as claimed in claim 1, having two lower members located on an inner side of each inwardfacing receiving hook for guiding said outward-facing engaging hooks into engagement with said inward-facing receiving hooks and maintaining engagement thereto.

5. A belt-like clamping device as claimed in claim 1, having two arms each attached to an inner side of the belt-like annular member substantially near one of the proximal ends.

6. A belt-like clamping device as claimed in claim 1, having an adhesive plate located on an outer side of the beltlike annular member for mounting.

7. A belt-like clamping device as claimed in claim 1, having a two keep members and a leg member located on an outer side of the belt-like annular member for mounting.

8. A belt-like clamping device comprising a belt-like annular member having a first and second proximal end, each proximal end having an outward-facing engaging hook and an inward-facing receiving hook laterally juxtaposed to a respective outward-facing engaging hook so that when the first proximal end is brought into engagement with the second proximal end:

the outward-facing engaging hook of the first proximal end engages the inward-facing receiving hook of the second proximal end and the outward-facing engaging hook of the second proximal end engages the inward-facing receiving hook of the first proximal end, said inward-facing receiving hooks on said first and second proximal ends each having a knob attached thereto for actuating the receiving hooks with a finger so that the belt-like clamping device may be opened.

9. A belt-like clamping device comprising a belt-like annular member having a first and second proximal end, each proximal end having an outward-facing engaging hook and an inward-facing receiving hook laterally juxtaposed to a respective outward-facing engaging hook so that when the first proximal end is brought into engagement with the second proximal end:

the outward-facing engaging hook of the first proximal end engages the inward-facing receiving hook of the second proximal end and the outward-facing engaging hook of the second proximal end engages the inward-facing receiving hook of the first proximal end, and further comprising two lower members located on an inner side of each inward-facing receiving hook for guiding said outward-facing engaging hooks into engagement with said inward-facing receiving hooks and maintaining engagement thereto.

* * * * *